(12) United States Patent
Breton et al.

(10) Patent No.: US 9,309,419 B2
(45) Date of Patent: Apr. 12, 2016

(54) INK WITH ENHANCED WETTING PROPERTIES

(71) Applicant: XEROX CORPORATION, Norwalk, CT (US)

(72) Inventors: Marcel P. Breton, Mississauga (CA); Biby Esther Abraham, Mississauga (CA); James D. Mayo, Mississauga (CA); Valerie M. Farrugia, Oakville (CA); Jenny Eliyahu, Maple (CA); Adela Goredema, Mississauga (CA); Barkev Keoshkerian, Thornhill (CA); Yvan Gagnon, Mississauga (CA); Gabriel Iftime, Cupertino, CA (US)

(73) Assignee: XEROX CORPORATION, Norwalk, CT (US)

( * ) Notice: Subject to any disclaimer, the term of this patent is extended or adjusted under 35 U.S.C. 154(b) by 22 days.

(21) Appl. No.: 14/261,258

(22) Filed: Apr. 24, 2014

(65) Prior Publication Data
US 2015/0307723 A1    Oct. 29, 2015

(51) Int. Cl.
| | | |
|---|---|---|
| *C09D 11/30* | (2014.01) | |
| *C09D 11/03* | (2014.01) | |
| *C09D 11/033* | (2014.01) | |
| *C09D 11/322* | (2014.01) | |
| *C09D 11/38* | (2014.01) | |

(52) U.S. Cl.
CPC ............. *C09D 11/03* (2013.01); *C09D 11/033* (2013.01); *C09D 11/322* (2013.01); *C09D 11/38* (2013.01)

(58) Field of Classification Search
CPC ........................................................ C09D 11/30
USPC .................................................. 523/160, 161
See application file for complete search history.

(56) References Cited

U.S. PATENT DOCUMENTS

| | | | | |
|---|---|---|---|---|
| 2006/0079602 | A1* | 4/2006 | Johnson et al. | 523/160 |
| 2006/0270756 | A1* | 11/2006 | Hanmura et al. | 523/160 |
| 2007/0043146 | A1* | 2/2007 | House et al. | 523/160 |

OTHER PUBLICATIONS

Viscosity of water taken from "Properties of Ordinary Water-Substance." N.E. Dorsey, p. 184. New York (1940).*
The Viscous Properties of Diols. V. 1,2—Hexanediol in Water and Butanol Solutions, Verlag der Zeitschrift für Naturforschung, Tübingen (2004).*
Several Properties of the 2-Pyrrolidone-Water System as Functions of Composition and Temperature, Journal of Chemical and Engineering Data, vol. 11, No. 2, Apr. 1966.*

* cited by examiner

*Primary Examiner* — Edward Cain
(74) *Attorney, Agent, or Firm* — MH2 TECHNOLOGY LAW GROUP, LLP

(57) ABSTRACT

An ink for a printer may include one or more latexes in an amount from about 0.1 wt % to about 15 wt %, one or more amines in an amount from about 0 wt % to about 2 wt %, and one or more pigments in an amount from about 0.5 wt % to about 8 wt %. The ink may also include four or more solvents that, in the aggregate, are present in an amount from about 10 wt % to about 50 wt %. The ink may further include one or more surfactants in an amount from about 0.001 wt % to about 3 wt %.

20 Claims, 1 Drawing Sheet

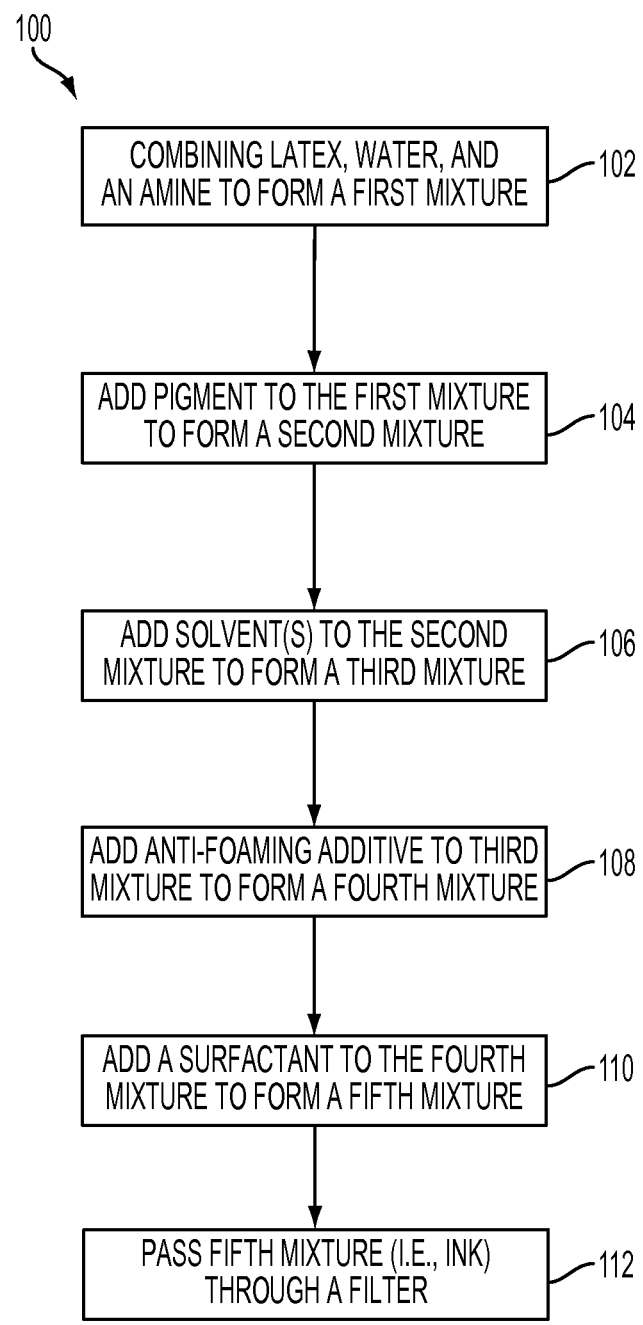

INK WITH ENHANCED WETTING PROPERTIES

TECHNICAL FIELD

The present teachings relate to an ink for a printer and, more particularly, to an aqueous ink for an indirect printing application.

BACKGROUND

In indirect aqueous printing, an aqueous ink is jetted onto an intermediate transfer member, typically called a blanket, and the ink is partially or fully dried on the blanket prior to transfixing an image to a media substrate, such as a sheet of paper. The blanket may be overcoated with a sacrificial layer to facilite transfix and long term printing reliability.

The ink is a mixture of water, a solvent, a colorant, and a polymer latex. The polymer latex may include an aqueous dispersion of polymer particles. The polymer latex may have a minimum film forming temperature from about 55° C. to about 110° C. and a glass transition temperature from about 45° C. to about 100° C. The softening point may be from about 40° C. to about 95° C.

There is a need for an ink with enhanced wetting properties for use in indirect aqueous printing utilizing a sacrificial layer.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An ink for a printer is disclosed. The ink may include one or more latexes in an amount from about 0.1 wt % to about 15 wt %, one or more amines in an amount from about 0 wt % to about 2 wt %, and one or more pigments in an amount from about 0.5 wt % to about 8 wt %. The ink may also include four or more solvents that, in the aggregate, are present in an amount from about 10 wt % to about 50 wt %. The ink may further include one or more surfactants in an amount from about 0.001 wt % to about 3 wt %.

In another embodiment the ink may include one or more latexes in an amount from about 0.1 wt % to about 15 wt %. The ink may also include one or more amines in an amount from about 0 wt % to about 2 wt %. The one or more amines may be selected from the group consisting of monoethanolamine, diethanolamine, triethanolamine, and a combination thereof. The ink may also include one or more pigments in an amount from about 0.5 wt % to about 8 wt %. The ink may also include four or more solvents that, in the aggregate, are present in an amount from about 10 wt % to about 50 wt %. At least one of the four or more solvents may be selected from the group consisting of glycerol, 2-pyrrolidone, 1,5 pentanediol, 1,3 propanediol, 2-butoxyethanol, diethylene glycol, 1,2 hexanediol, water, 1,2 propanediol, butyl carbitol, and a combination thereof. The four or more solvents, when combined, may have a viscosity that is less than or equal to about 75 centipoise at 32° C. The ink may also include an anti-foaming agent in an amount from about 0.01 wt % to about 5 wt %. The anti-foaming agent may be selected from the group consisting of an insoluble oil, a polydimethylsiloxane, a silicone, long chain fatty alcohols, fatty acid soaps and esters, a silicone glycol, or a combination thereof. The ink may further include one or more surfactants in an amount from about 0.001 wt % to about 3 wt %. The ink may have a jetting viscosity from about 3 centipoise to about 8 centipoise at 32° C. The ink may have a surface tension from about 10 dynes/cm to about 40 dynes/cm. Any particles in the ink may have a cross-sectional length less than or equal to about 0.20 µm.

A method for making an ink for a printer is also disclosed. The method may include mixing a latex, an amine, and water to form a first mixture. The first mixture may be stirred from about 100 RPM to about 500 RPM for about 30 seconds to about 30 minutes. A pigment may be mixed with the first mixture to form a second mixture. The second mixture may be stirred from about 100 RPM to about 500 RPM for about 30 seconds to about 30 minutes. Four or more solvents may be mixed with the second mixture to form a third mixture.

BRIEF DESCRIPTION OF THE DRAWING

The accompanying drawing, which is incorporated in and constitutes a part of this specification, illustrates embodiments of the present teachings and together with the description, serves to explain the principles of the disclosure. In the figure:

FIG. 1 depicts a flowchart of an illustrative method for forming an ink, according to one or more embodiments disclosed.

It should be noted that some details of the figure have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawing. Wherever possible, the same reference numbers will be used throughout the drawings to refer to the same, similar, or like parts.

As used herein, unless otherwise specified, the word "printer" encompasses any apparatus that performs a print outputting function for any purpose, such as a digital copier or printer, bookmaking machine, facsimile machine, a multi-function machine, etc. It will be understood that the structures depicted in the figures may include additional features not depicted for simplicity, while depicted structures may be removed or modified.

FIG. 1 depicts a flowchart 100 of an illustrative method for forming an ink, according to one or more embodiments disclosed. The method 100 may include combining latex, water, and an amine to form a first mixture, as shown at 102.

The latex may be natural or synthetic and may be a stable dispersion (e.g., emulsion) of monomer or polymer microparticles in an aqueous medium. Any monomer suitable for preparing a latex for use in an ink may be utilized. Suitable monomers that may be used to form a latex polymer emulsion, and thus the resulting latex particles in the latex emulsion may include, but are not limited to, styrenes, acrylates, methacrylates, butadienes, isoprenes, acrylic acids, methacrylic acids, acrylonitriles, combinations thereof, and the like.

The latex may also include at least one polymer. The number of polymers may range from 1 to 20, 2 to 15, or 3 to 10. Suitable polymers may include styrene acrylates, styrene butadienes, styrene methacrylates, and more specifically, poly(styrene-alkyl acrylate), poly(styrene-1,3-diene), poly (styrene-alkyl methacrylate), poly (styrene-alkyl acrylate-acrylic acid), poly(styrene-1,3-diene-acrylic acid), poly (styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly (butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly (methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly (styrene-butyl acrylate), poly (styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly (styrene-butadiene), poly(styrene-isoprene), poly(styrene-butyl methacrylate), poly(styrene-butyl acrylate-acrylic acid), poly(styrene-butyl methacrylate-acrylic acid), poly (butyl methacrylate-butyl acrylate), poly(butyl methacrylate-acrylic acid), poly(acrylonitrile-butyl acrylate-acrylic acid), or a combination thereof. The polymers may be block, random, or alternating copolymers.

The amine may be or include monoethanolamine, diethanolamine, triethanolamine ("TEA"), or a combination thereof.

Once combined, the first mixture may be mixed or stirred from about 100 RPM to about 1000 RPM, about 100 RPM to about 500 RPM, or about 200 RPM to about 400 RPM. The first mixture may be mixed or stirred for about 30 seconds to about 30 minutes, about 1 minute to about 20 minutes, about 1 minute to about 10 minutes, or longer.

One or more pigments may be added to the first mixture (e.g., while stirring) to form a second mixture, as shown at 104. In a specific embodiment, the pigment or colorant may be or include a magenta pigment, a cyan pigment, a yellow pigment, a black pigment, or a mixture or combination thereof. Examples of suitable pigments may include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); HOSTAPERM® Blue B2G-D (Clariant); HOSTAPERM® Blue B4G (Clariant); SPECTRA® PAC C Blue 15:4 (Sun Chemical); Permanent Red P-F7RK; HOSTAPERM® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); LUMOGEN® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL® 330 (Cabot), Nipex 150 (Evonik) Carbon Black 5250 and Carbon Black 5750 (Columbia Chemical), and the like, as well as mixtures thereof. The pigment(s) may be in the form of a dispersion in water. In at least one embodiment, the pigment may be of the self-dispersing type where the pigment is coated with a resin or polymeric dispersant. The resonated pigment(s) may be or include MCC-059-SJ, MCM-059-SJ, MCY-059-SJ, and/or MCBk-059-SJ sold by Sun Chemicals (about 14-15% by weight pigments); however, as will be appreciated, these pigments are merely illustrative and not intended to be limiting. A cross-sectional length (e.g., average diameter) of the pigment particles may be less than or equal to about 200 nm, less than or equal to about 150 nm, or less than or equal to about 100 nm.

Once the pigment is added, the second mixture may be mixed or stirred from about 100 RPM to about 1000 RPM, about 100 RPM to about 500 RPM, or about 200 RPM to about 400 RPM. The second mixture may be mixed or stirred for about 30 seconds to about 30 minutes, about 1 minute to about 20 minutes, about 1 minute to about 10 minutes, or longer.

One or more solvents may then be added to the second mixture to form a third mixture, as shown at 106. The number of solvents may one, two, three, four, five, six, or more. For example, the third mixture may include four or more solvents. The fourth solvent may add an additional degree of freedom that may allow ink design optimization (e.g., enhanced wetting) for a variety of skins or substrates. The term "enhanced wetting" as used in this application refers to both an improvement in the initial wetting of the substrate upon impact by the ink and an increase in the maximum spreading of the ink that is achievable on the substrate during the printing process. Maximum spreading may also be dependent on drop size and drop velocity.

The fourth solvent may still enable high yield transfer, good jettability (i.e., minimal or no nozzle blocking or drying on idling and good drop directionality), good ink stability, minimal or no latex or pigment aggregation and settling, and minimal or no swelling of the latex particles when exposed to the solvent mixture.

The solvents (or combination of solvents) provide improved latex inkjet ink performance. The solvents may be used to assure stability of the colorant, pigment, or dye; help control the film forming characteristics of the latexes/ink through preferential swelling of the latex particles; help control wetting characteristics of inks on a variety of substrates; solvent blend selection affects drying properties, rheological properties, jetting properties, flow properties in printhead ink channels, ink transfer for indirect printing processes.

The solvents may include alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof.

When mixtures of water and water soluble or miscible organic liquids are selected as the liquid vehicle, the water to organic ratio ranges may be any suitable or desired ratio. For example, the ratio may be from about 97:3 to about 30:70, from about 95:5 to about 40:60, or from about 90:10 to about 51:49. The non-water component of the liquid vehicle may serve as a humectant that has a boiling point higher than that of water (i.e., 100° C.), or as a co-solvent which has a boiling point as low as 70° C. The organic component of the ink vehicle may also serve to modify ink surface tension, modify ink viscosity, swell the latex and/or disperse the colorant, and/or affect the drying characteristics of the ink. In at least one embodiment, the co-solvent may be sulfolane, methyl ethyl ketone, isopropanol, 2-pyrrolidinone, polyethylene glycol, or a mixture thereof.

The total amount of liquid vehicle may be provided in any suitable or desired amount. In at least one embodiment, the liquid vehicle may be present in the ink composition in an amount of from about 55 wt % to about 97 wt %, or from about 60 wt % to about 90 wt %, or from about 65 wt % to about 90 wt %, by weight, based on the total weight of the ink composition.

In at least one embodiment, the solvents may be or include glycerol, 2-pyrrolidone, 1,5 pentanediol, 1,3 propanediol, 2-butoxyethanol, diethylene glycol, 1,2 hexanediol, water, 1,2 propanediol, butyl carbitol, Liponic® EG-1, ethoxylate of glycerine, or a combination thereof.

The properties of these illustrative solvents (at 32° C.) are shown in Table 1 below:

TABLE 1

| Solvent | Viscosity, cPs | Viscosity/cSt | Temperature, ° C. | VBN Index |
|---|---|---|---|---|
| glycerol | 510.00 | 485.71 | 32 | 37.5 |
| 2-pyrrolidone | 13.30 | 12.67 | 25 | 24.9 |
| 1,5 pentanediol | 90.00 | 85.71 | 32 | 32.7 |
| 1,3 propanediol | 52.00 | 49.52 | 20 | 30.8 |
| 2-butoxyethanol | 2.90 | 2.76 | 25 | 14.5 |
| diethylene glycol | 18.50 | 17.62 | 32 | 26.5 |
| 1,2 hexanediol | 46.04 | 43.85 | 32 | 30.4 |

TABLE 1-continued

| Solvent | Viscosity, cPs | Viscosity/cSt | Temperature, ° C. | VBN Index |
|---|---|---|---|---|
| water | 0.76 | 0.76 | 32 | −0.72 |
| 1,2 propanediol | 28.56 | 27.20 | 32 | 28.5 |
| butyl carbitol | 4.90 | 4.67 | 25 | 18.7 |

VBN is defined as the Viscosity Blending Number (VBN). The viscosity of the blend of two or more liquids can be estimated using the Refutas equation. See Maples, Robert E., *Petroleum Refinery Process Economics* (2nd ed.), Pennwell Books, 2000.

The first step is to calculate the Viscosity Blending Number (VBN) (also called the Viscosity Blending Index) of each component of the blend:

$$VBN = 14.534 \times \ln[\ln(v+0.8)] + 10.975 \quad (1)$$

where v is the kinematic viscosity in centistokes (cSt). The kinematic viscosity of each component of the blend may be obtained at the same temperature.

The next step is to calculate the VBN of the blend, using equation (2) below:

$$VBN_{Blend} = [x_A \times VBN_A] + [x_B \times VBN_B] + \ldots + [x_N \times VBN_N] \quad (2)$$

where $x_x$ is the mass fraction of each component of the blend.

Once the viscosity blending number of a blend has been calculated using equation (2), the kinematic viscosity of the blend may be determined by solving equation (1) for v:

$$v = \exp\left(\exp\left(\frac{VBN_{Blend} - 10.975}{14.534}\right)\right) - 0.8, \quad (3)$$

where $VBN_{Blend}$ is the viscosity blending number of the blend.

The solvent set when including of 4 or more solvents has a viscosity that may be less than or equal to about 100 centipoise ("cPs") at 32° C., less than or equal to about 75 cps at 32° C., or less than or equal to about 50 cps at 32° C. It is believed that such conditions are preferred to minimize the building of a viscous plug as a result of water evaporation from the inkjet printhead nozzles when the printhead/printer is idle. The solvent set viscosity at 32° C. may be greater than or equal to about 10 cps so to enable formulation of piezo inkjet inks having good and stable high frequency jetting without front face wetting. If only one solvent at a high concentration or weight percent in the ink is selected, instead of a mixture of solvents making up that same concentration, it may have detrimental effects on the blanket (e.g., swelling) and on the stability and jettability of the ink. The inks described herein were found to have excellent long term stability in the printhead with no jetting problems even after the printhead was kept idle for a period of two months.

Once the solvents are added, the third mixture may be mixed or stirred from about 100 RPM to about 1000 RPM, about 200 RPM to about 800 RPM, or about 400 RPM to about 600 RPM. The third mixture may be mixed or stirred for about 15 seconds to about 30 minutes, about 30 seconds to about 10 minutes, or about 30 seconds to about 5 minutes.

One or more anti-foaming additives may be added to the third mixture to form a fourth mixture, as shown at 108. The anti-foaming additive(s) may reduce or hinder the formation of foam during the processing of the ink. The anti-foaming additive(s) may be or include insoluble oils, polydimethylsiloxanes, other silicones, alcohols, stearates, glycols, or a combination thereof.

Once the anti-foaming additive(s) are added, the fourth mixture may be mixed or stirred from about 100 RPM to about 1000 RPM, about 200 RPM to about 800 RPM, or about 400 RPM to about 600 RPM. The fourth mixture may be mixed or stirred for about 15 seconds to about 30 minutes, about 30 seconds to about 10 minutes, or about 30 seconds to about 5 minutes.

One or more surfactants may be added to the third or fourth mixture to form a fifth mixture, as shown at 110. The surfactant(s) may lower the surface tension between two or more of the compounds (e.g., liquids or solids) in the fifth mixture. The surfactant(s) may be or include SURFYNOL® 104H, CHEMGUARD® S-761P, or a combination thereof. CHEMGUARD® S-761 P is a short chain perfluoro-based anionic fluorosurfactant of the phosphate ester type. It may provide surface tensions as low as 16 dynes/cm in water at very low concentrations. It also has excellent dynamic surface tension properties, allowing for rapid attainment of low equilibrium surface tensions. CHEMGUARD® S-761P may impart excellent wetting, spreading, leveling, and flow control properties on various types of water-based coatings for architectural paints and stains, concrete coatings, industrial coatings as well as aqueous hydrocarbon surfactant solutions. CHEMGUARD® S-761 P may be low foaming and may provide improved dirt pick-up resistance to exterior paints and interior low gloss paints, sealers, and stains.

SURFYNOL® 104H is a nonionic surfactant that has a combination of benefits, including wetting, defoaming, and improving pigment dispersions. Its unique chemical structure provides multifunctional properties such as surface tension reduction, foam control, and viscosity stabilization, SURFYNOL® 104H is a 75% active liquid in Ethylene Glycol. SURFYNOL® 104H may provide performance benefits in many waterborne applications such as coatings, paints, adhesives, inks, pigment manufacture and dispersion, cements, metalworking lubricants, agricultural chemicals and dye processing, Other suitable surfactants may include ionic surfactants, anionic surfactants, cationic surfactants, nonionic surfactants, zwitterionic surfactants, and the like, as well as mixtures thereof. Suitable surfactants may also include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof.

Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, available from Rhone-Poulenc as IGEPAL® CA-210 IGEPAL® CA-520, IGEPAL® CA-720, IGEPAL® CO-890, IGEPAL® C0-720, IGEPAL® C0-290, IGEPAL® CA-210, ANTAROX® 890, and ANTAROX® 897. Suitable nonionic surfactants may also include a block copolymer of polyethylene oxide and polypropylene oxide, including those commercially available as SYNPERONIC® PE/F, such as SYNPERONIC® PE/F 108.

Suitable anionic surfactants may include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN® R, NEOGEN® SC available from Daiichi Kogyo Seiyaku, combinations thereof, and the like. Suitable anionic surfactants may also include DOWFAX® 2A1, an alkyldiphenyloxide disulfonate from Dow Chemical Company, and/or TAYCA POWER BN2060 from Tayca Corporation (Japan), which are branched sodium dodecyl benzene sulfonates.

Once the surfactant(s) are added, the fifth mixture, now ink, may be mixed or stirred from about 100 RPM to about 1000 RPM, about 200 RPM to about 800 RPM, or about 400 RPM to about 600 RPM. The fifth mixture (i.e., ink) may be mixed or stirred for about 5 minutes to about 2 hours, about 10 minutes to about 90 minutes, or about 20 minutes to about 1 hour.

The fifth mixture (i.e., ink) may then pass through a filter having a plurality of openings to separate any solid particulates larger than a predetermined size, as shown at 112. The openings may have a cross-sectional length (e.g., diameter) less than or equal to about 0.50 μm, less than or equal to about 0.40 μm, or less than or equal to about 0.30 μm.

Latex may be present in the ink from about 0.1 wt % to about 15 wt %, about 1 wt % to about 10 wt %, or about 2 wt % to about 6 wt %. Water may be present in the ink from about 40 wt % to about 90 wt %, about 50 wt % to about 80 wt %, or about 60 wt % to about 70 wt %. Amine may be present in the ink from about 0.0 wt % to about 2 wt %, about 0.1 wt % to about 1.5 wt %, or about 0.2 wt % to about 1.0 wt %. Pigment may be present in the ink from about 0.5 wt % to about 8 wt %, about 1 wt % to about 6 wt %, or about 2 wt % to about 4 wt %. Solvent (e.g., aggregate wt % of four or more solvents) may be present in the ink from about 10 wt % to about 50 wt %, about 15 wt % to about 40 wt %, or about 20 wt % to about 30 wt %. The anti-foaming additive may be present in the ink from about 0.01 wt % to about 5 wt %, about 0.1 wt % to about 3 wt %, or about 0.5 wt % to about 2 wt %. Surfactant may be present in the ink form about 0.001 wt % to about 3 wt %, about 0.01 wt % to about 2 wt %, or about 0.1 wt % to about 1 wt %. In addition the total amount of pigment and latex in the ink may be less than 15 wt %, and the ratio of latex to pigment may be from about 0.2:1 to about 2.0:1, about 0.5:1 to about 1.5:1, or about 0.7:1 to about 1.3:1.

Reducing the viscosity of the solvent set to within the range disclosed above may cause the filtered ink (which includes the solvent set) to have a jetting viscosity from about 1.5 cps to about 10 cps at 32° C., about 3 cps to about 8 cps at 32° C., or about 5 cps to about 6 cps at 32° C. Optimization of the viscosity of the solvent blends used for an ink may enhance wetting performance. This may particularly be the case if the optimization of the viscosity is combined with a surfactant to adjust the dynamic surface tension properties of the ink. As a result of enhanced wetting and spreading, a smaller amount of ink may be required for printing an image. For example, a drop of the ink having a mass from about 5.0 ng to about 10 ng, when printed on a substrate coated with a semi-crystalline polyvinylalcohol polymer, may be configured to spread from about 2 times to about 4 times of an original drop diameter while maintaining a dot circularity of less than 1.1. The filtered ink may have a surface tension from about 15 dynes/cm to about 50 dynes/cm, about 15 dynes/cm to about 40 dynes/cm, or about 20 dynes/cm to about 30 dynes/cm.

Examples 1-3 below describe illustrative inks (and properties thereof) prepared using the method 100 of FIG. 1. The examples are not intended to be limiting.

EXAMPLE 1

A first illustrative ink produced by the method 100 shown in FIG. 1 may include 3 solvents: 2-pyrrolidone, glycerol, and 1,5 pentanediol. The formulation of this ink may be seen in Table 2 below:

TABLE 2

| Component | Solids wt % in the ink | Solid Content % in Component | Wt % of Component in Ink | Mass used to make ink in grams |
|---|---|---|---|---|
| VF798 | 4.35 | 44.75 | 9.72 | 106.93 |
| Betaine | 3.50 | 100 | 3.50 | 38.50 |
| 2-pyrrolidone | 2.50 | 100 | 2.50 | 27.50 |
| Glycerol | 10.00 | 100 | 10.00 | 110.00 |
| TEA | 1.00 | 100 | 1.00 | 11.00 |
| 104H | 0.20 | 100 | 0.20 | 2.20 |
| Pigment | 3.65 | 15 | 24.33 | 267.67 |
| 1,5 pentanediol | 20.30 | 100 | 20.30 | 223.30 |
| Chemgard sS761p | 0.0075 | 100 | 0.0075 | 0.0825 |
| Water | 54.49 | 100 | 28.44 | 312.82 |
| Total | 100.00 | | 100 | 1100.00 |

The ink in Example 1 was jetted on a DIMATIX® 2800 printer and printed on two different mediums: (1) EPSON® premium photo paper and (2) biaxially oriented polypropylene (Bopp) paper coated with a dry coating (referred to herein as Coating A) obtained from a glycerol containing aqueous solution of a partially hydrolyzed (87-89%) polyvinylalcohol (CELVOL® 203) containing a non ionic surfactant that has an HLB value of about 13, (e.g., TERGITOL® TMN-6) and glycerol as cosolvent. The amount of glycerol may be between about 0.5 wt % and 5 wt % by weight of the coating solution, preferably from about 2 wt % to 5 wt %. In this particular embodiment, the amount of glycerol was 3% by weight, and the amount of surfactant was 0.1% by weight, but the amount may be outside these ranges. Suitable semi-crystalline partially hydrolyzed polyvinylalcohol may include those available from Sekisui under commercial name, CELVOL®, e.g., CELVOL® 203, 205, 502, 513, 523, 540, and 418. The ink was printed with a drop mass from about 7.0-7.2 ng, a drop velocity of about 8 m/s, a frequency of about 5 kHz, and a voltage from about 19-23 V. The diameters of the printed dots are shown in Table 3 below, and the circularities of the printed dots are shown in Table 4 below.

TABLE 3

| | EPSON ® premium photo paper | Bopp paper with Coating A |
|---|---|---|
| Dots in μm | 39.4 | 53.1 |
| Lines in μm | 33 | 51 |

TABLE 4

| Ink and Substrate | Circularity |
|---|---|
| Ink from Table 2 on EPSON ® premium photo paper | 0.9 |
| Ink from Table 2 on Bopp paper with coating A | 0.9 |

EXAMPLE 2

Another illustrative ink produced by the method shown in FIG. 1 may include 4 or more solvents: diethylene glycol, 1,5 pentanediol, 1,3 propanediol, glycerol, and 2-pyrollidone. The properties of this ink may be seen in Table 5 below:

TABLE 5

| Component | Solids wt % in the ink | Solid Content % in Component | Wt % of Component in Ink | Mass used to make ink in grams |
|---|---|---|---|---|
| BK31075-72 | 4.35 | 41.50 | 10.5 | 5.24 |
| Diethylene glycol | 7.50 | 100.00 | 7.5 | 3.75 |
| 1,5 pentanediol | 7.50 | 100.00 | 7.5 | 3.75 |
| 1,3 propanediol | 4.40 | 100.00 | 4.4 | 2.20 |
| Glycerol | 12.00 | 100.00 | 12.0 | 6.00 |
| 2-pyrollidone | 2.60 | 100.00 | 2.6 | 1.30 |
| Betaine | 3.50 | 100.00 | 3.5 | 1.75 |
| Pigment (black) | 3.65 | 14.87 | 24.5 | 12.27 |
| Triethanolamine | 1.00 | 100.00 | 1.0 | 0.50 |
| LIPONIC ® EG-1 | 0.70 | 100.00 | 0.7 | 0.35 |
| CHEMGUARD ® S-761P (34 active) | 0.01 | 100.00 | 0.0 | 0.00 |
| Surfynol 420 | 0.30 | 100.00 | 0.3 | 0.15 |
| Water | 52.49 | 100.00 | 25.5 | 12.73 |
| Total | 100 | | 100.0 | 50.00 |

Like the ink in Example 1, the ink in Example 2 was jetted on a DIMATIX® 2800 printer and printed on two different mediums: (1) EPSON® premium photo paper and (2) Bopp paper coated with Coating A. The ink was printed with a drop mass from about 7.0-7.2 ng, a drop velocity of about 8 m/s, a frequency of about 5 kHz, and a voltage from about 19-23 V. The diameters of the printed dots are shown in Table 6 below, and the circularities of the printed dots are shown in Table 7 below. The diameters and circularities were measured using the PIAS II. The PIAS II is the personal image Analysis system—a digital loupe using a high resolution optic module of about 5 μm/pixel, which has a field of view about 3.2 mm×2.4 mm to measure the dot size and the diameter.

TABLE 6

| | EPSON ® premium photo paper | Bopp paper with Coating A |
|---|---|---|
| Dots in μm | 38.5 | 61.3 |
| Lines in μm | 33 | 63 |

TABLE 7

| Ink and Substrate | Circularity |
| --- | --- |
| Ink from Table 6 on EPSON ® premium photo paper | 0.9 |
| Ink from Table 6 on Bopp paper with GS-10 skin | 1.0 |

EXAMPLE 3

Yet another illustrative ink produced by the method shown in FIG. 1 may include 4 or more solvents: diethylene glycol, 1,5 pentanediol, 1,3 propanediol, glycerol, and 2-pyrollidone. The properties of this ink may be seen in Table 8 below:

TABLE 8

| Component | Solids wt % in the ink | Solid Content % in Component | Wt % of Component in Ink | Mass used to make ink in grams |
| --- | --- | --- | --- | --- |
| BK31075-72 | 4.35 | 41.50 | 10.5 | 5.24 |
| Diethylene glycol | 7.50 | 100.00 | 7.5 | 3.75 |
| 1,5 pentanediol | 7.50 | 100.00 | 7.5 | 3.75 |
| 1,3 propanediol | 4.40 | 100.00 | 4.4 | 2.20 |
| Glycerol | 12.00 | 100.00 | 12.0 | 6.00 |
| 2-pyrollidone | 2.60 | 100.00 | 2.6 | 1.30 |
| 1,2 hexanediol | 3.50 | 100.00 | 3.5 | 1.75 |
| Pigment (black) | 3.65 | 14.87 | 24.5 | 12.27 |
| Triethanolamine | 1.00 | 100.00 | 1.0 | 0.50 |
| LIPONIC ® EG-1 | 0.70 | 100.00 | 0.7 | 0.35 |
| CHEMGUARD ® S-761p (34 active) | 0.01 | 100.00 | 0.0 | 0.00 |
| Surfynol 420 | 0.30 | 100.00 | 0.3 | 0.15 |
| Water | 52.49 | 100.0 | 25.5 | 12.73 |
| Total | 100 |  | 100.0 | 50.00 |

Like the ink from Examples 1 and 2, the ink in Example 3 was jetted on a DIMATIX® 2800 printer and printed on two different mediums: (1) EPSON® premium photo paper and (2) Bopp paper coated with Coating A. The ink was printed with a drop mass from about 7.0-7.2 ng, a drop velocity of about 8 m/s, a frequency of about 5 kHz, and a voltage from about 19-23 V. The diameters of the printed dots are shown in Table 9 below, and the circularities of the printed dots are shown in Table 10 below.

TABLE 9

|  | EPSON ® premium photo paper | Bopp paper with GS-10 skin |
| --- | --- | --- |
| Dots in µm | 39.9 | 62.6 |
| Lines in µm | 34 | 64 |

TABLE 10

| Ink and Substrate | Circularity |
| --- | --- |
| Ink from Table 9 on EPSON ® premium photo paper | 0.9 |
| Ink from Table 9 on Bopp paper with Coating A | 1.0 |

Examples 4 and 5 below describe illustrative methods for preparing a latex that may be included in the ink (e.g., in step 102 above). The examples are not intended to be limiting.

EXAMPLE 4

Preparation of Emulsion Polymerization Latex

A surfactant solution of 1.99 grams of DOWFAX® 2A1 (anionic alkyldiphenyloxide disulfonate) and 285.43 grams of de-ionized water was prepared by mixing for 10 minutes in a stainless steel holding tank. The holding tank was then purged with nitrogen for 5 minutes before transferring the mixture into a reactor. The reactor was then continuously purged with nitrogen while being stirred at 450 RPM. The reactor was then heated up to 80° C. at a controlled rate. Separately, 4.38 grams of ammonium persulfate initiator was dissolved in 45.54 grams of deionized water.

Separately, a monomer emulsion was prepared by adding 229.13 grams of styrene, 62.69 grams of butyl acrylate, 45.39 grams of methacrylic acid, 10.12 grams of beta CEA, 2.07 grams of 1-dodecanethiol, and 1.18 grams of 1,10-decanediol diacrylate ("ADOD") to a premix of 11.27 grams of DOW-FAX® 2A1 in 152.91 grams of deionized water. 1% of the emulsion (4.3 grams) was then slowly added into the reactor containing the aqueous surfactant phase at 80° C. to form the "seeds" while being purged with nitrogen. The initiator solution was then slowly charged into the reactor. The monomer emulsion was split into two aliquots. The first aliquot of 252.2 grams of the monomer emulsion was initially fed into the reactor at 2.03 grams/minute. The second aliquot of 259.8 grams of the monomer emulsion was mixed with 2.45 grams of 1-dodecane thiol ("DDT") and added to the reactor at 2.89 grams per minute. Once all of the monomer emulsion was charged into the reactor, the temperature was held at 80° C. for an additional two hours to complete the reaction. Full cooling was then applied, and the reactor temperature was reduced to 25° C. The product was collected into a holding tank and sieved with a 25 µm screen. The particle size was then measured by a NANOTRAC® U2275E particle size analyzer to have a $D_{50}$ of 131.3 nm and a $D_{95}$ of 187.9 nm.

EXAMPLE 5

Preparation of Latex 360 grams of DOWFAX® 2A1, 11 grams of surfactant, and 360 grams of water were added to a 1 liter glass reactor. The reactor was heated to 80° C. with a nitrogen purge. An aqueous solution containing 3.7 grams of ammonium persulfate and 37 grams of water was then added to the reactor. A feed of a monomer solution was then added to the reactor at a rate of about 1.7 grams per minute. The monomer solution included 95 grams of styrene, 149 grams of n-butyl acrylate, 8.5 grams of b-carboxyethyl acrylate, and 3.7 grams of dodecylthiol. Once the monomer feed was added to the reactor, the latex was stirred for 2.5 hours resulting in a latex with a solids loading of 43.8% and a particle size ($D_{50}$) of 49.3 nm. The glass transition temperature ("Tg") of the dried latex was 75.4° C., and the softening temperature of the latex was 105.8° C.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter may take on negative values. In this case, the example value of range stated as "less than 10" may assume negative values, e.g.–1, –2, –3, –10, –20, –30, etc.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural components and/or processing stages may be added, or existing structural components and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed:
1. An ink for a printer, comprising:
one or more latexes in an amount from about 0.1 wt % to about 15 wt %, wherein the one or more latexes comprise:
an anionic alkyldiphenyloxide disulfonate mixed with deionized water to form a first mixture;
an ammonium persulfate mixed with deionized water to form a second mixture;
a styrene, a butyl acrylate, a methacrylic acid, a beta-carboxyethyl acrylate, a 1-dodecanethiol, a 1,10-decanediol diacrylate, an anionic alkyldiphenyloxide disulfonate, and deionized water mixed together to form a third mixture, wherein the first mixture and the third mixture are mixed together to form a fourth mixture, and wherein the fourth mixture is subsequently mixed with the second mixture to form a fifth mixture;
one or more amines in an amount from about 0 wt % to about 2 wt %;
one or more pigments in an amount from about 0.5 wt % to about 8 wt %;
four or more solvents that, in the aggregate, are present in an amount from about 10 wt % to about 50 wt %; and
one or more surfactants in an amount from about 0.001 wt % to about 3 wt %.

2. The ink of claim 1, wherein the four or more solvents are selected from the group consisting of glycerol, 2-pyrrolidone, 1,5 pentanediol, 1,3 propanediol, 2-butoxyethanol, diethylene glycol, 1,2 hexanediol, water, 1,2 propanediol, butyl carbitol, and a combination thereof.

3. The ink of claim 1, further comprising an anti-foaming agent in an amount from about 0.01 wt % to about 5 wt %, wherein the anti-foaming agent is selected from the group consisting of an insoluble oil, a polydimethylsiloxane, a silicone, long chain fatty alcohols, fatty acid soaps and esters, a silicone glycol, or a combination thereof.

4. The ink of claim 1, wherein the four or more solvents, when combined, have a viscosity that is less than or equal to about 75 centipoise at 32° C.

5. The ink of claim 1, wherein the ink has a jetting viscosity from about 3 centipoise to about 8 centipoise at 32° C.

6. The ink of claim 1, wherein the ink has a surface tension from about 10 dynes/cm to about 40 dynes/cm, and wherein any particles in the ink have a cross-sectional length less than or equal to about 0.20 μm.

7. The ink of claim 1, wherein the one or more latexes and the one or more pigments, when combined, are present in the ink in an amount less than or equal to about 15 wt %, and wherein a ratio between the one or more latexes and the one or more pigments is from about 0.2:1.0 to about 2.0:1.0.

8. The ink of claim 1, wherein a drop of the ink having a mass from about 5.0 ng to about 10 ng, when printed on a substrate coated with a semi-crystalline polyvinylalcohol polymer, is configured to spread from about 2 times to about 4 times of an original drop diameter while maintaining a dot circularity of less than 1.1.

9. An ink for a printer, comprising:
one or more latexes in an amount from about 0.1 wt % to about 15 wt %, wherein the one or more latexes comprise:
an anionic alkyldiphenyloxide disulfonate, a surfactant, and water mixed together to form a first mixture;
ammonium persulfate and water mixed together to form a second mixture; and
a styrene, an n-butyl acrylate, a b-carboxyethyl acrylate, and a dodecylthiol mixed together to form a third mixture, wherein the first mixture is mixed with the second mixture to form a fourth mixture, and wherein the fourth mixture is subsequently mixed with the third mixture to form a fifth mixture;

one or more amines in an amount from about 0 wt % to about 2 wt %, wherein the one or more amines is selected from the group consisting of monoethanolamine, diethanolamine, triethanolamine, and a combination thereof;

one or more pigments in an amount from about 0.5 wt % to about 8 wt %;

four or more solvents that, in the aggregate, are present in an amount from about 10 wt % to about 50 wt %, wherein at least one of the four or more solvents is selected from the group consisting of glycerol, 2-pyrrolidone, 1,5 pentanediol, 1,3 propanediol, 2-butoxyethanol, diethylene glycol, 1,2 hexanediol, water, 1,2 propanediol, butyl carbitol, and a combination thereof, and wherein the four or more solvents, when combined, have a viscosity that is less than or equal to about 75 centipoise at 32° C.;

an anti-foaming agent in an amount from about 0.01 wt % to about 5 wt %, wherein the anti-foaming agent is selected from the group consisting of an insoluble oil, a polydimethylsiloxane, a silicone, long chain fatty alcohols, fatty acid soaps and esters, a silicone glycol, or a combination thereof; and one or more surfactants in an amount from about 0.001 wt % to about 3 wt %, wherein the ink has a jetting viscosity from about 3 centipoise to about 8 centipoise at 32° C., wherein the ink has a surface tension from about 10 dynes/cm to about 40 dynes/cm, and wherein any particles in the ink have a cross-sectional length less than or equal to about 0.20 μm.

10. A method for making an ink for a printer, comprising:

mixing an anionic alkyldiphenyloxide disulfonate with deionized water to form a first mixture;

mixing an ammonium persulfate with deionized water to form a second mixture;

mixing a styrene, a butyl acrylate, a methacrylic acid, a beta-carboxyethyl acrylate, a 1-dodecanethiol, a 1,10-decanediol diacrylate, an anionic alkyldiphenyloxide disulfonate, and deionized water together to form a third mixture;

mixing the first mixture with the third mixture to form a fourth mixture;

mixing the fourth mixture with the second mixture to form a latex;

mixing the latex, an amine, and water to form a fifth mixture;

stirring the fifth mixture from about 100 RPM to about 500 RPM for about 30 seconds to about 30 minutes;

mixing a pigment with the fifth mixture to form a sixth mixture;

stirring the sixth mixture from about 100 RPM to about 500 RPM for about 30 seconds to about 30 minutes; and mixing four or more solvents with the sixth mixture to form a seventh mixture.

11. The method of claim 10, further comprising stirring the seventh mixture from about 200 RPM to about 800 RPM for about 15 seconds to about 30 minutes.

12. The method of claim 11, further comprising mixing an anti-foaming agent with the seventh mixture to form an eighth mixture.

13. The method of claim 12, further comprising stirring the eighth mixture from about 200 RPM to about 800 RPM for about 15 seconds to about 30 minutes.

14. The method of claim 11, further comprising mixing a surfactant with the seventh mixture to form an eighth mixture.

15. The method of claim 14, further comprising stirring the eighth mixture from about 200 RPM to about 800 RPM for about 5 minutes to about 2 hours.

16. The method of claim 15, further comprising filtering the eighth mixture to separate any particles having a cross-sectional length greater than about 0.50 μm.

17. The method of claim 16, wherein the eighth mixture has a jetting viscosity from about 3 centipoise to about 8 centipoise at 32° C., wherein the fourth mixture has a surface tension from about 15 dynes/cm to about 40 dynes/cm.

18. The ink of claim 1, wherein a portion of the third mixture is mixed with dichlorodiphenyltrichloroethane prior to being mixed with the first mixture.

19. The method of claim 10, wherein the first mixture is mixed together in a steel tank, and further comprising:

purging the tank, having the first mixture therein, with nitrogen;

transferring the first mixture from the tank to a reactor after the tank is purged with nitrogen;

purging the reactor, having the first mixture therein, with nitrogen;

stirring the first mixture within the reactor; and heating the first mixture to about 80° C. while the first mixture is in the reactor.

20. The method of claim 19, further comprising:

mixing a first portion of the third mixture with the first mixture in the reactor;

after the first portion of the third mixture is mixed with the first mixture in the reactor, mixing a second portion of the third mixture with dichlorodiphenyltrichloroethane prior to mixing the second portion of the third mixture with the first mixture in the reactor;

heating the latex to about 80° C. while the latex is in the reactor; and subsequently cooling the latex to about 25° C.

* * * * *